United States Patent [19]

Jaunarajs

[11] 4,272,294

[45] Jun. 9, 1981

[54] ALKALI RESISTANT GLASS ARTICLE AND METHOD OF PREPARATION

[75] Inventor: Karlis L. Jaunarajs, Littleton, Colo.

[73] Assignee: Johns-Manville Corporation, Denver, Colo.

[21] Appl. No.: 77,451

[22] Filed: Sep. 20, 1979

[51] Int. Cl.$^3$ .................... C04B 31/06; D02G 3/00
[52] U.S. Cl. .................... 106/99; 427/389.8; 428/389; 428/392
[58] Field of Search ............ 428/392, 375, 379, 389, 428/378; 65/3 C; 106/99; 427/390 A, 390 R; 260/45.75 W

[56] References Cited

U.S. PATENT DOCUMENTS

| | | | |
|---|---|---|---|
| 2,019,021 | 10/1935 | O'Brien . | |
| 2,022,750 | 12/1935 | Toohey . | |
| 2,501,316 | 3/1950 | Crandell et al. | 428/392 X |
| 2,688,007 | 8/1954 | Steinman | 428/392 X |
| 2,728,949 | 1/1956 | Sweet . | |
| 3,025,588 | 3/1962 | Eilerman | 428/392 |
| 3,783,092 | 1/1974 | Majumdar | 428/392 X |
| 3,852,051 | 12/1974 | Fahey | 65/3 C |
| 4,013,478 | 3/1977 | Meyer | 106/98 |
| 4,118,239 | 10/1978 | Gagin | 106/50 |
| 4,119,477 | 10/1978 | Cohen et al. | 428/392 X |
| 4,147,555 | 4/1979 | Cohen et al. | 106/99 |
| 4,191,585 | 3/1980 | Jaunarajs | 106/99 |

*Primary Examiner*—Lorraine T. Kendell
*Attorney, Agent, or Firm*—Robert M. Krone; Joseph J. Kelly

[57] ABSTRACT

A glass fiber article having enhanced alkali resistance is described. The glass fiber has thereon a coating comprising zinc stearate and a film forming polymer with the coating being present in an amount of 1 to 60% by weight of solids based on weight of the glass fiber. The polymer is preferably initially in the form of a latex and is selected from the group consisting of acrylic terpolymers, vinyl acetate/ethylene copolymers, vinyl acetate/vinyl chloride/ethylene terpolymers, urethane polymers and epoxy polymers. The glass fiber is used at a rate of approximately 5% to 20% as reinforcing fiber in Portland cement and other alkaline cementitious composites. Such composites are also described, as is a method of imparting alkali resistance to glass fiber by applying such coating to the fiber.

15 Claims, No Drawings

ALKALI RESISTANT GLASS ARTICLE AND METHOD OF PREPARATION

TECHNICAL FIELD

The invention herein relates to alkali resistant glass articles. More particularly it relates to coatings to impart alkali resistance to glass fibers.

BACKGROUND OF PRIOR ART

When glass fibers are used in alkaline environments, such as when they are used as fibrous reinforcement for Portland cement, they are attacked by the alkali and deteriorate rapidly. Since economic and environmental considerations have made the use of glass fiber for cement reinforcement much more attractive in recent years, there have been numerous efforts to render glass fibers less susceptible to alkaline attack. These efforts have had two principal directions: First, much effort has been directed toward developing glass compositions which are themselves resistant to alkaline attack. For instance, one type of glass composition which is commercially used and considered moderately alkaline resistant contains large amounts of zirconia. Fibers made of such compositions deteriorate much less rapidly in alkaline environments than do fibers made of conventional glass compositions such as the well-known "E glass." The alkali resistant glass compositions, however, are quite expensive and thus cannot be readily used for such purposes as cement reinforcement without unduly raising the cost of the finished cement product.

The second approach to imparting alkali resistance to glass articles has been to develop coatings for the glass fibers which will prevent the alkaline components from contacting and attacking the glass surface. Use of such coatings is intended to allow the glass fiber to be composed of inexpensive and conventional materials such as those in the aforementioned "E glass." Alternatively, use of such coatings on fibers of alkali resistant glass compositions would enhance that alkali resistance and significantly extend the useful life of the expensive alkali resistant fibers, thus improving the economics of their use for cement reinforcement and similar uses.

Zinc stearate has been used for fiber coating in the past in minute quantities to impart a measure of moisture resistance to the fiber body. Such use is illustrated in U.S. Pat. Nos. 2,019,021; 2,022,750 and 2,728,949. It has also been used glass coatings in very small amounts to provide a degree of lubrication; see U.S. Pat. No. 3,025,588. Water soluble low molecular weight zinc compounds (specifically those which are salts of weak acids such as zinc formate, zinc acetate and zinc oxalate) have been used as surface coatings to impart a degree of alkali resistance to glass fiber; see U.S. Pat. No. 4,013,478. Film forming polymeric resins are widely used as a principal component in glass fiber sizes used to impart abrasion resistance or compatibility with organic resin bodies which the glass fibers are intended to reinforce. See, e.g., U.S. Pat. No. 4,147,555.

It is an object of this invention to provide a coating for glass fiber which will impart a significant degree of alkali resistance to the glass fiber and which can be readily applied and which is retained on the glass fiber in an alkaline, especially cement, environment. It is also an object of this invention to provide an alkali resistant coated glass fiber article.

BRIEF SUMMARY OF THE INVENTION

The invention herein is a fibrous glass article which is resistant to an alkaline environment and which comprises glass fiber having thereon a coating comprising zinc stearate and a film forming polymer, the coating being present as 1 to 60% by weight of solids based on the weight of glass fiber. In particular embodiments, the glass fiber may be a non-alkali-resistant glass composition or an alkali resistant glass composition. In a preferred embodiment the film forming polymer is an acrylic emulsion polymer, preferably an acrylic emulsion terpolymer. Also part of the invention is the method of imparting enhanced alkali resistance to glass fiber by coating it with the coating comprising zinc stearate and a film forming polymer such that 1 to 60% by weight of solids of the coating based on the weight of glass fiber are deposited on the glass fiber.

DETAILED DESCRIPTION OF THE INVENTION

The zinc stearate used herein in the coating of the present invention can be any zinc stearate of commerce. Zinc stearate is commonly considered to be the zinc salt of stearic acid with the formula: $Zn(C_{18}H_{35}O_2)_2$. When used herein it will be in a form compatible with the film forming polymer. Thus it may be in a finely powdered form dispersed in the polymer or polymer emulsion, it may be used molten and mixed with molten polymer (since its melting point is on the order of 120° C.) or it may be dispersed in water and mixed with a polymer emulsion. It is particularly advantageous to have both the zinc stearate and the polymer dispersed in water in the form of emulsions such that a single mixed fluid can be deposited on the glass fiber surface. Typical of the commercial zinc stearate materials which can be used is an aqueous dispersion of zinc stearate sold under the trademark "Petrac ZW-45" by Petrochemicals Company, Inc. This material has a solids content of 45%, a Brookfield #2 viscosity at 12 rpm of 400 cps and a pH of 8.7.

The film forming polymers used in the present invention are preferably in the form of latexes, i.e., aqueous emulsions. Among the polymers which may be used as latexes in the present invention are acrylic polymers (especially acrylic terpolymers), vinyl acetate/ethylene copolymers, vinyl acetate/vinyl chloride/ethylene terpolymers, urethane polymers and epoxy polymers. The film forming polymers of the present invention must be resistant to an alkaline environment, dispersible and stable in water at various concentrations, have particle sizes on the order of approximately 0.2 μm (range of 0.1 to 1.0 μm), be stable at temperatures above the melting point of zinc stearate, be adherent to glass surfaces, and have an adequate shelf life after water dilution and mixing with the zinc stearate. The chemical natures of these various types of polymers are widely described in the art. For instance, acrylic emulsion polymers, urethane polymers, and epoxy resin polymers are described in Myers and Long, *Film-Forming Compositions*, vol. 1, part I (1967); and these and the vinyl polymers are described in Martens, *Technology of Paints, Varnishes and Lacquers* (1968). Representative examples of the various classes of polymers meeting the physical requirements of the present invention are set forth in Table I.

TABLE I

| Trademark | Commercial Supplier | Type of Polymer(a) | Emulsion Properties(b) | | | |
|---|---|---|---|---|---|---|
| | | | Solids Content | pH | Viscosity cps | Average Particle Size, μm |
| Versaflex-1 | W. R. Grace & Co. | AcTP | 54-56% | 5-6 | 200-800 | 0.2 |
| Resyn 2833 | National Starch Co. | AcTP | 45% | 4.6 | 300 | 0.14 |
| Elvace 1960 | DuPont Co. | VAc/Et | 50% | 4.5 | 50-250 | n.a. |
| Airflex 500 | Air Products & Chemicals Co. | VAc/Et | 55% | 5-5.6 | 200-500 | 0.17 |
| Airflex 400 | Air Products & Chemicals Co. | VAc/Et | 55-57% | 4-4.5 | 1100-1600 | 0.2-1 |
| Airflex 728 | Air Products & Chemicals Co. | VAc/VC/Et | 52% | n.a. | 300-800 | 0.17 |
| Witcobond W-210 | Witco Chemical Co. | Urethane | 35% | 7.3-7.9 | 150-220 | n.a. |
| Witcobond W-250 | Witco Chemical Co. | Urethane | 35% | 7.3-7.9 | 150-220 | n.a. |
| EPI-REZ WD-510 | Celanese Polymer Specialties Co. | Epoxy | 100% (resin) | n.a. | 10,000 | — |

Note
(a)Polymer types:
AcTP = acrylic terpolymer
VAc/Et = vinyl acetate/ethylene copolymer
VAc/VC/Et = vinyl acetate/vinyl chloride/ethylene terpolymer
(b)n.a. = not available The coatings of the present invention will be present on the glass fiber in a concentration of from 1 to 60% solids by weight based on weight of glass fiber, and preferably in the range of from 3 to 25% solids by weight. The zinc stearate will comprise 10 to 80% by weight of the coating solids, preferably about 15 to 60%, with the remainder of the coating being composed of the polymer solids.

The coating of the present invention may be applied in any suitable manner. The coating may be sprayed through suitable spraying equipment onto the glass fibers, the glass fibers may be dipped in a liquid body of the coating or the coating may be applied to an applicator such as a rotating drum and carried by the motion of the applicator onto the surface of glass fibers coming in contact with the applicator.

The cementitious material which is to be reinforced by the coated glass fiber of this invention may be any alkaline cementitious material. Such materials include Portland cement, calcium silicate, sulfate cements and the like. The coated glass fiber will be present in the cement matrix in amounts of from about 5% to about 20% by weight of the composite. The coated glass fiber may be in the form of individual fibers, fiber strands (groups of individual filaments), non-woven mats, woven fabrics, papers and so forth.

The examples below will illustrate the invention. In the experiments described below in Tables IIA and IIB composite samples were formed from Portland cement reinforced with mats of alkali resistant glass fibers. The glass fibers were of a composition as described in U.S. Pat. No. 4,118,239 and the fiber diameters were an average of 14 μm. The control samples had glass fibers mats in which the glass fibers were coated with a conventional glass fiber size containing a poly(vinyl acetate) film former and a silane coupling agent. The control size was applied to the glass mat in an amount of approximately 9.4% solids by weight of fiber glass and dried at 350° F. (177° C.). The second sample utilized an acrylic terpolymer (the above mentioned Versaflex-1 material) applied in an amount of 8.7% solids by weight of glass fiber and dried at 300° F. (149° C.). The third sample which exemplifies the present invention utilized a coating of zinc stearate and the aforementioned "Versaflex-1" acrylic terpolymer with the zinc stearate and resin being present in a solids ratio of 53:47 by weight. The coating was applied at 14.3% solids by weight of glass fiber and was dried at 450° F. (232° C.). In each case the coating was applied to the glass fiber mat as an aqueous emulsion containing between about 7 to 15% solids by weight. The glass fiber in each sample was present as 5% by weight of the reinforced cement composite. The composite samples were placed in a conventional humidity chamber and all were cured for 14 days or 28 days at 70° F. (21° C.) and 100% relative humidity ("normal cure"). One group of the samples in the chamber were then taken out and tested for flexural strength and the results tabulated were obtained; these are designated as the "normal cure" samples. Two remaining groups of samples which had been subjected to the "normal cure" were then held for an additional 32 days with one group being held at 90° F. (32° C.) and 90% relative humidity and the other being held at 120° F. (49° C.) and 100% relative humidity. At the end of the 32 day additional periods the flexural strengths of these samples were measured.

TABLE IIA

| | Flexural Strength at Limit of Proportionality, lb/in² (N/cm²)/% change | | |
|---|---|---|---|
| | Control | Acrylic Terpolymer | Zinc Stearate and Acrylic Terpolymer |
| Normal Cure (14 days) | 1590(1096)/— | 1774(1223)/— | 1559(1075)/— |
| 90° F./90% RH | 1523(1050)/−4% | 1529(1054)/−14% | 1878(1295)/+20% |
| 120° F./100% RH | 1418(978)/−11% | 1330(917)/−25% | 1902(1311)/+22% |
| Normal Cure (28 days) | 1875(1293)/— | 1595(1100)/— | 1640(1131)/— |
| 90° F./90% RH | 1506(1038)/−20% | 2180(1503)/+36% | 1795(1238)/+9% |

TABLE IIA-continued

| | Flexural Strength at Limit of Proportionality, lb/in² (N/cm²)/% change | | |
|---|---|---|---|
| | Control | Acrylic Terpolymer | Zinc Stearate and Acrylic Terpolymer |
| 120° F./100% RH | 1134(782)/ −40% | 1689(1165)/ +6% | 1988(1371)/ +21% |

TABLE IIB

| | Flexural Strength at Ultimate Tensile Strength, lb/in² (N/cm²)/% change | | |
|---|---|---|---|
| | Control | Acrylic Terpolymer | Zinc Stearate and Acrylic Terpolymer |
| Normal Cure (14 days) | 4467(3080)/— | 3038(2094)/— | 4683(3229)/— |
| 90° F./90% RH | 2390(1648)/ −46% | 2335(1610)/ −23% | 3599(2481)/ −23% |
| 120° F./100% RH | 1685(1162)/ −62% | 1553(1071)/ −49% | 2053(1415)/ −56% |
| Normal Cure (28 days) | 4039(2785)/— | 4152(2862)/— | 4230(2916)/— |
| 90° F./90% RH | 3003(2070)/ −26% | 2613(1801)/ −37% | 3079(2123)/ −27% |
| 120° F./100% RH | 1863(1284)/ −54% | 1897(1308)/ −54% | 2248(1550)/ −47% |

It will be evident from these data that the use of the terpolymer alone does not consistently afford any significant degree of alkali resistance as compared to the control coating. The combination of zinc stearate and the terpolymer, however, affords significant improvement in the flexural strength and alkali resistance of the composite, particularly when measured at the limit of proportionality. (The measurement at limit of proportionality is more significant than that at ultimate tensile strength, for structural materials are normally designed on the basis of their limit of proportionality rather than ultimate strength since the former is significantly less.)

The data in Table III will also illustrate the present invention. In this case the same "Versaflex-1" terpolymer was used diluted to a strength of 10% solids content in the emulsion, the zinc stearate was added as solid zinc stearate dispersed in the terpolymer emulsion to a strength of 5% solids (A), as a dust applied to the glass fiber which was already coated with the wet terpolymer emulsion (B) and as the aforementioned "Petrac ZW-45" dispersion mixed with the terpolymer emulsion and applied at a rate of 10% of the zinc stearate dispersion in the diluted terpolymer emulsion (C and D). The coated fiber strands with the uncoated controls were mounted on stainless steel frames which were then submerged in a synthetic cement effluent known as "Lawrence solution" and which contains 0.88 grams NaOH, 3.45 grams KOH and 0.48 grams Ca(OH)₂ per liter of distilled water and has a pH of approximately 13.1. The solution was maintained at 80° C. (176° F.) for the period of time stated.

TABLE III

| Coating | Coating, Wt. % | Exposure Time, hrs | Retained Strength, % |
|---|---|---|---|
| (A) Uncoated control | 0 | 0 | 100 |
| Uncoated control | 0 | 72 | 36 |
| Terpolymer | 10.8 | 72 | 76 |
| Terpolymer and Zinc Stearate | 12.7 | 72 | 86 |
| (B) Uncoated control | 0 | 0 | 100 |
| Terpolymer | 11.0 | 168 | 60 |
| Terpolymer and Zinc Stearate | 10.0 | 168 | 75 |
| (C) Uncoated control | 0 | 0 | 100 |
| Terpolymer and Zinc Stearate | 4.6 | 168 | 84 |
| (D) Uncoated control | 0 | 0 | 100 |

TABLE III-continued

| Coating | Coating, Wt. % | Exposure Time, hrs | Retained Strength, % |
|---|---|---|---|
| Terpolymer and Zinc Stearate | 15 | 168 | 67 |

STATEMENT OF INDUSTRIAL APPLICATION

The invention herein involves coatings for glass fibers intended to impart alkali resistance to the fibers. Such coated fibers find utility in the reinforcement of Portland cement and other cementitious solid materials which utilize fiber reinforcement to produce increased tensile strength of the reinforced body. Such reinforced materials as the reinforced Portland cements can be used for articles such as architectural panels, retaining walls and the like.

I claim:

1. A glass fiber article having enhanced alkali resistance which comprises glass fiber having thereon a coating comprising zinc stearate and a film forming polymer, said coating being present as 1 to 60% by weight of solids based on the weight of glass fiber.

2. An article as in claim 1 wherein said coating is present as 3 to 25% by weight of solids based on the weight of glass fiber.

3. An article as in claim 1 wherein said film forming polymer is selected from the group consisting of acrylic terpolymers, vinyl acetate/ethylene copolymers, vinyl acetate/vinyl chloride/ethylene terpolymers, urethane polymers and epoxy polymers.

4. An article as in claim 2 wherein said film forming polymer is selected from the group consisting of acrylic terpolymers, vinyl acetate/ethylene copolymers, vinyl acetate/vinyl chloride/ethylene terpolymers, urethane polymers and epoxy polymers.

5. An article as in claims 1, 2, 3 or 4 wherein said zinc stearate comprises 10% to 80% by weight of the coating solids and the remainder is the polymer.

6. An article as in claim 5 wherein said zinc stearate comprises 15% to 60% by weight of the coating solids and the remainder is the polymer solids.

7. An article as in claims 1, 2, 3 or 4 wherein said polymer is an acrylic terpolymer.

8. An article as in claims 1, 2, 3 or 4 wherein said polymer is initially in the form of an aqueous emulsion which is dried on the glass fiber to deposit the polymer solids.

9. An article as in claims 1, 2, 3 or 4 wherein said glass fiber is formed from a composition having relatively low alkali resistance.

10. An article as in claim 9 wherein said glass fiber is formed from an "E glass" composition.

11. An article as in claims 1, 2, 3 or 4 wherein said glass fiber is formed from a composition having relatively high alkali resistance.

12. An article as in claim 1, 2, 3 or 4 wherein said coating consists essentially of said zinc stearate and said film forming polymer.

13. A reinforced article comprising an alkaline cementitious matrix having incorporated therein a reinforcing glass fiber article as in claims 1, 2, 3 or 4.

14. A reinforced article as in claim 13 wherein said reinforcing glass article represents a glass fiber concentration in the reinforced article in the range of from 5% to 20% by weight of said reinforced article.

15. A reinforced article as in claim 14 wherein said reinforcing glass article is in the form of a non-woven mat.

* * * * *